United States Patent
Fujii et al.

(10) Patent No.: US 12,237,532 B2
(45) Date of Patent: Feb. 25, 2025

(54) POWER SUPPLY DEVICE, AND VEHICLE AND ELECTRICAL STORAGE DEVICE EACH EQUIPPED WITH SAME

(71) Applicant: SANYO Electric Co., Ltd., Osaka (JP)

(72) Inventors: Yusuke Fujii, Aichi (JP); Takuya Egashira, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 0 days.

(21) Appl. No.: 17/906,878

(22) PCT Filed: Jan. 20, 2021

(86) PCT No.: PCT/JP2021/001786
§ 371 (c)(1),
(2) Date: Sep. 21, 2022

(87) PCT Pub. No.: WO2021/199594
PCT Pub. Date: Oct. 7, 2021

(65) Prior Publication Data
US 2023/0117874 A1    Apr. 20, 2023

(30) Foreign Application Priority Data
Mar. 31, 2020    (JP) ................... 2020-064065

(51) Int. Cl.
*H01M 50/358*    (2021.01)
*H01M 50/276*    (2021.01)
(Continued)

(52) U.S. Cl.
CPC ....... *H01M 50/358* (2021.01); *H01M 50/276* (2021.01); *H01M 50/278* (2021.01);
(Continued)

(58) Field of Classification Search
CPC ............. H01M 50/358; H01M 50/276; H01M 50/278; H01M 50/282; H01M 50/3425;
(Continued)

(56) References Cited

U.S. PATENT DOCUMENTS

2010/0000816 A1* 1/2010 Okada ................. H01M 50/209
                                                                    180/68.5
2012/0164490 A1* 6/2012 Itoi ..................... H01M 50/358
                                                                    429/82
(Continued)

FOREIGN PATENT DOCUMENTS

CN    102473884 A     5/2012
CN    110103691 A *   8/2019  .......... H01M 50/249
(Continued)

OTHER PUBLICATIONS

Machine translation of JP2015135763A, obtained from PE2E. (Year: 2015).*

(Continued)

*Primary Examiner* — Lingwen R Zeng
(74) *Attorney, Agent, or Firm* — WHDA, LLP

(57) ABSTRACT

Power supply device includes: battery stack in which a plurality of battery cells each including, on a top surface thereof, gas discharge valve that opens when an internal pressure of outer covering can increases are stacked; first cover provided on a top surface of battery stack and defining first gas duct communicating with gas discharge valve; and second cover provided on a top surface of first cover and defining second gas duct on a top surface of first gas duct. A plurality of communication holes through which first gas duct and second gas duct communicate with each other are formed on the top surface of first cover.

8 Claims, 12 Drawing Sheets

(51) Int. Cl.
  *H01M 50/278* (2021.01)
  *H01M 50/282* (2021.01)
  *H01M 50/342* (2021.01)
  *H01M 50/209* (2021.01)
  *H01M 50/249* (2021.01)
  *H01M 50/367* (2021.01)

(52) U.S. Cl.
  CPC ..... *H01M 50/282* (2021.01); *H01M 50/3425* (2021.01); *H01M 50/209* (2021.01); *H01M 50/249* (2021.01); *H01M 50/367* (2021.01); *H01M 2220/20* (2013.01); *Y02E 60/10* (2013.01)

(58) Field of Classification Search
  CPC ........... H01M 2220/20; H01M 50/209; H01M 50/249; H01M 50/367; Y02E 60/10
  See application file for complete search history.

(56) References Cited

U.S. PATENT DOCUMENTS

| | | | | |
|---|---|---|---|---|
| 2013/0330579 A1* | 12/2013 | Ejiri | ...................... | H01M 50/30 429/53 |
| 2014/0113167 A1 | 4/2014 | Itoi et al. | | |
| 2015/0125720 A1* | 5/2015 | Fujii | ................... | H01M 50/209 429/56 |
| 2015/0137824 A1 | 5/2015 | Nishihara | | |
| 2016/0104923 A1* | 4/2016 | Shiotsu | ............... | H01M 50/394 429/87 |
| 2018/0316207 A1* | 11/2018 | Irish | ....................... | H02J 7/0014 |
| 2020/0067045 A1* | 2/2020 | Takano | ............... | H01M 50/342 |
| 2020/0317357 A1* | 10/2020 | Demont | .............. | H01M 50/358 |
| 2021/0384584 A1* | 12/2021 | Scheid | .............. | H01M 50/3425 |
| 2024/0039111 A1* | 2/2024 | Jeong | .................. | H01M 10/613 |

FOREIGN PATENT DOCUMENTS

| | | | | |
|---|---|---|---|---|
| JP | 2015135763 A | * | 7/2015 | ............. Y02E 60/13 |
| JP | 2016-054127 | | 4/2016 | |
| KR | 19980024850 U | | 7/1998 | |
| WO | 2014/024452 | | 2/2014 | |

OTHER PUBLICATIONS

Machine translation of CN110103691A, obtained from PE2E. (Year: 2019).*

International Search Report of PCT application No. PCT/JP2021/001786 dated Apr. 6, 2021.

English translation of Search Report dated Dec. 1, 2023, issued in counterpart CN Application No. 202180011240.X. (4 pages).

Extended (Supplementary) European Search Report dated May 31, 2024, issued in counterpart EP application No. 21782306.1. (7 pages).

* cited by examiner

Comparative Example

POWER SUPPLY DEVICE, AND VEHICLE AND ELECTRICAL STORAGE DEVICE EACH EQUIPPED WITH SAME

CROSS-REFERENCE TO RELATED APPLICATIONS

This application is a U.S. national stage application of the PCT International Application No. PCT/JP2021/001786 filed on Jan. 20, 2021, which claims the benefit of foreign priority of Japanese patent application No. 2020-064065 filed on Mar. 31, 2020, the contents all of which are incorporated herein by reference.

TECHNICAL FIELD

The present disclosure relates to a power supply device, and a vehicle and an electrical storage device including the power supply device.

BACKGROUND ART

A power supply device such as a battery module or a battery pack including a plurality of battery cells is used as a power source for a vehicle such as a hybrid vehicle or an electric vehicle, a power source for an electrical storage system for a factory, a home, or the like (See, for example, PTL 1).

The battery cell constituting such a power supply device is provided with a gas discharge valve that opens and releases gas when an inside of an outer covering can becomes high pressure at the time of abnormality. When the inside of any of the battery cells becomes high pressure for some reason such as thermal runaway, high-temperature and high-pressure gas is released from the gas discharge valve. Therefore, the power supply device is provided with a gas duct for releasing such gas to an outside. When a large amount of gas is released to the outside of the power supply device at a high temperature, the gas may be ignited. However, when the high-temperature gas is prevented from being released to the outside of the power supply device and the high-temperature gas remains in the gas duct, it is conceivable that thermal runaway is expanded by heating other battery cells. Therefore, although a configuration capable of avoiding any state is required, it is not easy to realize the configuration.

CITATION LIST

Patent Literature

PTL 1: WO 2014/024452 A

SUMMARY OF THE INVENTION

An object of one aspect of the present invention is to provide a power supply device capable of safely discharging gas to the outside when the gas is discharged from a battery cell, and a vehicle and an electrical storage device including the power supply device.

A power supply device according to an aspect of the present invention is a power supply device including: a battery stack in which a plurality of battery cells are stacked, each of the battery cells including a gas discharge valve on a top surface of the battery cell, and the gas discharge valve opening when an internal pressure of an outer covering can increases; a first cover provided on a top surface of the battery stack and defining a first gas duct that communicates with the gas discharge valve; and a second cover provided on a top surface of the first cover and defining a second gas duct on a top surface of the first gas duct, wherein a plurality of communication holes that communicate the first gas duct and the second gas duct are formed on the top surface of the first cover.

With the above configuration, when the gas is discharged from the battery cells, the gas is branched into the first gas duct and the second gas duct to disperse and discharge the gas, so that it is possible to prevent the gas from staying inside the power supply device and to suppress a situation in which the gas discharged to the outside is ignited.

DESCRIPTION OF EMBODIMENT

Figure 1:
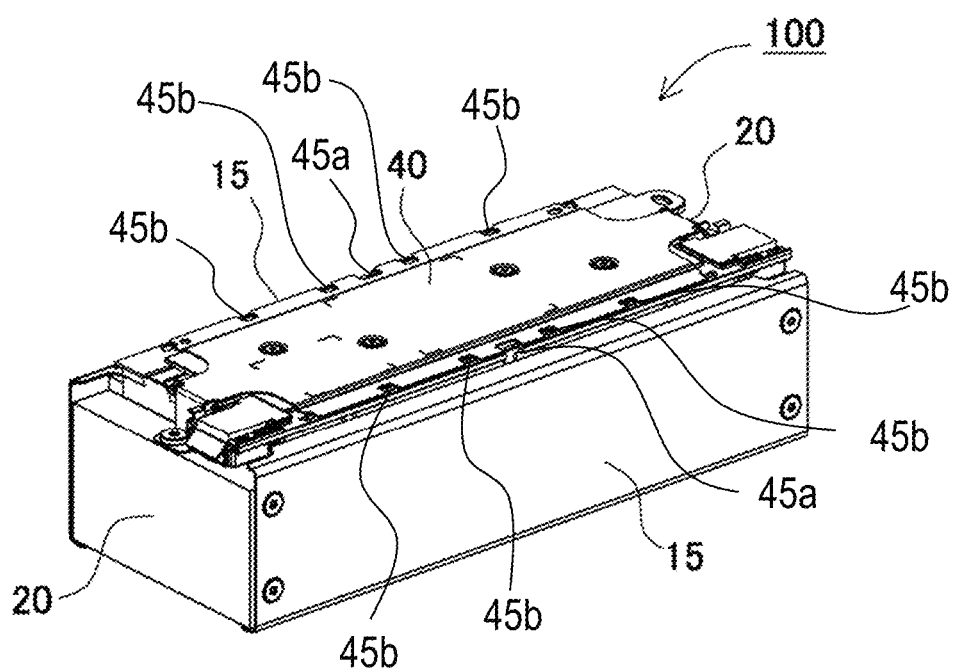
FIG. 1 is a perspective view illustrating a power supply device according to a first exemplary embodiment of the present invention.

An exemplary embodiment of the present invention may be specified by the following configuration.

In a power supply device according to an exemplary embodiment of the present invention, in addition to the above configuration, the first cover opens the communication holes at positions offset from the gas discharge valve of the battery cell.

In a power supply device according to another exemplary embodiment of the present invention, in addition to any of the configurations described above, the first cover is provided with a communication rib protruding toward a side of the second cover around each of the communication holes. With the above configuration, the communication rib can prevent a situation in which the first cover is pressed by a pressure of the gas and an opening part to the second gas duct is deformed so as to be closed.

Further, in a power supply device according to another exemplary embodiment of the present invention, in addition to any of the configurations described above, the first cover is provided with a partition rib that partitions between adjacent ones of the plurality of communication holes. With the above configuration, it is possible to prevent high-pressure gas introduced from the communication holes into the second gas duct from being discharged in a concentrated manner at one place.

Furthermore, in a power supply device according to another embodiment of the present invention, in addition to any of the configurations described above, each of the communication holes is formed in a slit shape.

Furthermore, in a power supply device according to another exemplary embodiment of the present invention, in addition to any of the configurations described above, the first cover is made of resin.

Furthermore, in a power supply device according to another exemplary embodiment of the present invention, in addition to any of the configurations described above, the second cover is made of metal.

Furthermore, in a power supply device according to another exemplary embodiment of the present invention, in addition to any of the configurations described above, each of the battery cells includes: the outer covering can having a square shape with an upper opening; and a sealing plate that closes the opening of the outer covering, wherein the gas discharge valve is provided in a central part of the sealing plate, and the first gas duct is configured to discharge gas in a stacking direction of the battery cells and a side surface direction orthogonal to the stacking direction. With the above configuration, the gas can be efficiently discharged in a direction intersecting with the stacking direction of the battery cells in addition to the stacking direction of the battery cells.

Furthermore, an electric vehicle according to another exemplary embodiment of the present invention includes: any of the power supply devices described above; a drive motor to which electric power is supplied from the power supply device; a vehicle main body on which the power supply device and the motor are mounted; and wheels driven by the motor to cause the vehicle main body to travel.

Furthermore, an electrical storage device according to another exemplary embodiment of the present invention includes: any of the power supply devices described above; and a power supply controller that controls charging to and discharging from the power supply device, wherein the power supply controller enables charging to the battery cells with electric power from an outside power source, and controls the battery cells to be charged.

Exemplary embodiments of the present invention will be described with reference to the accompanying drawings. However, the exemplary embodiments described below are examples for embodying the technical idea of the present invention, and the present invention is not limited to the exemplary embodiments described below. Further, in the present specification, members indicated in the claims are not limited to the members of the exemplary embodiments. In particular, the dimensions, materials, shapes, and the relative arrangement of the constituent members described in the exemplary embodiments are not intended to limit the scope of the present invention only thereto unless otherwise specified and are merely illustrative examples. Note that the sizes and positional relationships of the members illustrated in the drawings may be exaggerated for clarity of description. Further, in the following description, the same names and marks indicate the same or similar members, and detailed description will be appropriately omitted. Furthermore, the elements constituting the present invention may be configured such that a plurality of elements are constituted of the same member to form one member that functions as the plurality of elements, or conversely, a function of one member can be shared and achieved by a plurality of members. In addition, the description in some examples or exemplary embodiments may be applied to other examples, exemplary embodiments, and the like.

A power supply device according to the exemplary embodiment is used for various applications such as a power source that is mounted on an electric vehicle as a hybrid vehicle or an electric automobile and supplies electric power to a drive motor, a power source that stores generated electric power of natural energy such as solar power generation or wind power generation, and a power source that stores midnight electric power, and is particularly used as a power source suitable for high-power and high-current applications. In the following example, an exemplary embodiment applied to a power supply device for driving an electric vehicle will be described.

First Exemplary Embodiment

Figure 2:
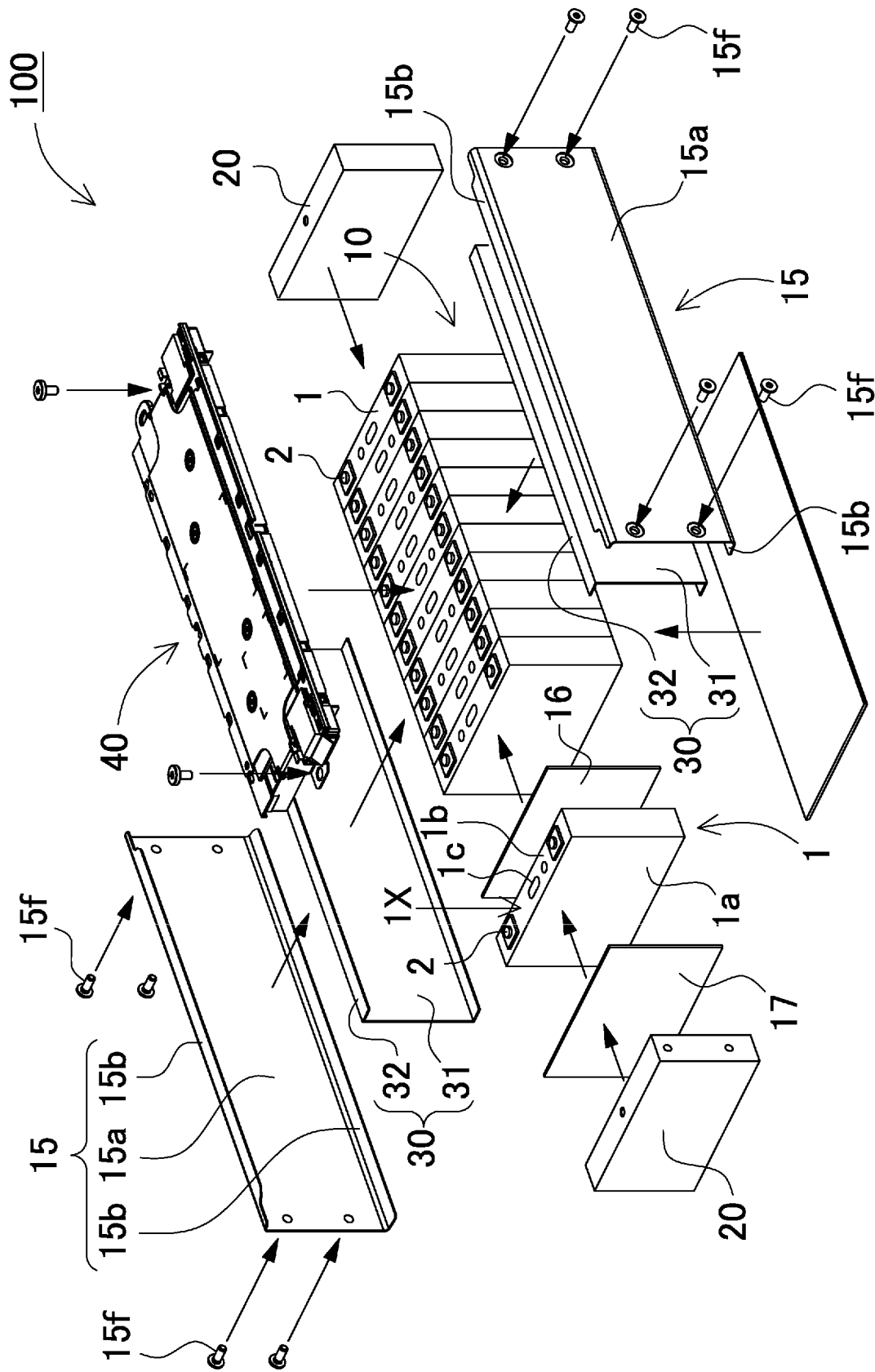
FIG. 2 is an exploded perspective view of the power supply device illustrated in FIG. 1.

Power supply device 100 according to a first exemplary embodiment of the present invention is illustrated in FIGS. 1 and 2. In these drawings, FIG. 1 is an exploded perspective view of power supply device 100 according to a first exemplary embodiment, and FIG. 2 is an exploded perspective view of power supply device 100 illustrated in FIG. 1.

Power supply device 100 illustrated in these drawings includes battery stack 10 in which a plurality of battery cells 1 are stacked, a pair of end plates 20 that cover both side end surfaces of battery stack 10, a plurality of fastening members 15 that fasten end plates 20 to each other, and cover assembly 40 provided on a top surface of battery stack 10.

Each of fastening members 15 is formed in a plate shape extended in a stacking direction of the plurality of battery cells 1. Fastening members 15 are disposed on opposite side surfaces of battery stack 10, respectively, to fasten end plates 20 to each other.

(Battery Stack 10)

As illustrated in FIG. 2, battery stack 10 includes a plurality of battery cells 1 each including positive and negative electrode terminals 2, and bus bars connected to electrode terminals 2 of the plurality of battery cells 1 to connect the plurality of battery cells 1 in parallel and in series. The plurality of battery cells 1 are connected in parallel or in series via these bus bars. Each of battery cells 1 is a chargeable and dischargeable secondary battery. In power supply device 100, the plurality of battery cells 1 are connected in parallel to form a parallel battery group, and a plurality of the parallel battery groups are connected in series, so that a large number of battery cells 1 are connected in parallel and in series. In power supply device 100 illustrated in FIG. 2, the plurality of battery cells 1 are stacked to form battery stack 10. Further, the pair of end plates 20 is disposed on both end surfaces of battery stack 10. End parts of fastening members 15 are fixed to end plates 20, and battery cells 1 in a stacked state are fixed in a pressed state.

(Battery Cell 1)

As illustrated in FIG. 2, battery cells 1 are prismatic batteries having a width larger than the thickness, in other words, a width smaller than the width, and are stacked in a thickness direction to form battery stack 10. Each of battery cells 1 can be, for example, a lithium ion secondary battery. Further, the battery cell can be any chargeable secondary battery such as a nickel metal hydride battery and a nickel cadmium battery. Battery cell 1 houses positive and negative electrode plates in outer covering can 1a having a sealed structure together with an electrolyte solution. Exterior can 1a includes a metal sheet such as aluminum or an aluminum alloy press-molded into a rectangular shape, and includes an opening part that is hermetically sealed with sealing plate 1b. Sealing plate 1b is made of the same aluminum or aluminum alloy as rectangular outer covering can 1a, and positive and negative electrode terminals 2 are fixed to both ends of sealing plate 1b. Further, sealing plate 1b is provided with, between positive and negative electrode terminals 2, gas discharge valve 1c as a safety valve that opens in response to a change in pressure inside each of battery cells 1.

The plurality of battery cells 1 are stacked such that the thickness direction of each battery cell 1 is the stacking direction to constitute battery stack 10. At this time, the power of battery stack 10 can be increased by making the number of the battery cells stacked larger than usual. In such a case, battery stack 10 is long extended in the stacking direction. In battery cells 1, terminal surfaces 1X on which positive and negative electrode terminals 2 are provided are disposed on the same plane, and the plurality of battery cells 1 are stacked to form battery stack 10. A top surface of battery stack 10 is a surface on which gas discharge valves 1c of the plurality of battery cells 1 are provided.

(Electrode Terminal 2)

In each of battery cells 1, as illustrated in FIG. 2 and the like, sealing plate 1b as a top surface is used as terminal surface 1X, and positive and negative electrode terminals 2 are fixed to both ends of terminal surface 1X. A protruding part of each of electrode terminals 2 has a cylindrical shape. However, the protruding part is not necessarily cylindrical, and may have a polygonal columnar shape or an elliptical columnar shape.

Positions at which positive and negative electrode terminals 2 are fixed to sealing plate 1b of battery cell 1 are set to be positions where the positive electrode and the negative electrode are bilaterally symmetrical. Consequently, as illustrated in FIG. 2, battery cells 1 are stacked while horizontally reversed, and electrode terminals 2 of the positive electrode and the negative electrode which are adjacent to each other are connected by the bus bar, so that adjacent battery cells 1 can be connected in series. Note that the present invention does not specify the number and a connection state of the battery cells constituting the battery stack. The number and the connection state of the battery cells constituting the battery stack can be various changed including other exemplary embodiments to be described later.

The plurality of battery cells 1 are stacked such that the thickness direction of each battery cell 1 is the stacking direction to constitute battery stack 10. In battery stack 10, the plurality of battery cells 1 are stacked such that terminal surfaces 1X on which positive and negative electrode terminals 2 are provided, that is, sealing plates 1b in FIG. 2 are flush with each other.

In battery stack 10, insulating spacer 16 may be interposed between adjacent battery cells 1. Insulating spacer 16 is made of an insulating material such as resin in a thin plate shape or a sheet shape. Insulating spacer 16 has a plate shape having substantially the same size as a facing surface of battery cell 1. Insulating spacer 16 can be stacked between adjacent battery cells 1 to insulate adjacent battery cells 1 from each other. Note that, as a spacer disposed between adjacent battery cells, a spacer having a shape in which a flow path of a cooling gas is formed between the battery cell and the spacer can also be used. Further, a surface of the battery cell can also be covered with an insulating material. For example, a surface of the outer covering can excluding electrode parts of the battery cell may be covered with a shrink film such as a PET resin. In this case, the insulating spacer may be omitted. Further, in a power supply device in which a plurality of battery cells are connected in multiple parallel and multiple series, an insulating spacer is interposed between the battery cells connected in series to insulate the battery cells, and on the other hand, no voltage difference occurs between adjacent outer coverings in the battery cells connected in parallel, so that the insulating spacer between these battery cells can be omitted.

Furthermore, in power supply device 100 illustrated in FIG. 2, end plates 20 are disposed on both end surfaces of battery stack 10. Note that end surface spacer 17 may be interposed between each of end plates 20 and battery stack 10 to insulate the end plate and the battery stack from each other. End surface spacer 17 can also be made of an insulating material such as resin in a thin plate shape or a sheet shape.

In power supply device 100 according to the first exemplary embodiment, in battery stack 10 in which the plurality of battery cells 1 are stacked on each other, electrode terminals 2 of the plurality of battery cells 1 adjacent to each other are connected by bus bars, and the plurality of battery cells 1 are connected in parallel and in series. Further, a bus bar holder may be disposed between battery stack 10 and each of the bus bars. By using the bus bar holder, the plurality of bus bars can be disposed at fixed positions on the top surface of the battery stack while insulating the plurality of bus bars from each other and insulating terminal surfaces 1X of the battery cells and the bus bars. Further, cover assembly 40 to be described later may be integrated with the bus bar holder.

The bus bar is manufactured into a predetermined shape by cutting and processing a metal sheet. As the metal sheet constituting the bus bar, a metal having low electrical resistance and light weight, for example, an aluminum plate, a copper plate, or an alloy thereof can be used. However, as the metal sheet of the bus bar, other metals having small electrical resistance and light weight or alloys thereof can also be used.

(End Plate 20)

As illustrated in FIG. 2, end plates 20 are disposed at both ends of battery stack 10, and are fastened via a pair of left and right fastening members 15 disposed along both side surfaces of battery stack 10. End plates 20 are disposed at both ends of battery stack 10 in the stacking direction of battery cells 1 and outside end surface spacers 17 to sandwich battery stack 10 from both ends.

(Fastening Member 15)

Both ends of fastening member 15 are fixed to end plates 20 disposed on both end surfaces of battery stack 10. End plates 20 are fixed by a plurality of fastening members 15, whereby battery stack 10 is fastened in the stacking direction. As illustrated in FIG. 2 and the like, fastening members 15 are each made of metal having a predetermined width and a predetermined thickness along the side surface of battery stack 10, and are disposed to face both side surfaces of battery stack 10. As each of fastening members 15, a metal sheet such as iron, preferably a steel plate can be used. Fastening member 15 made of a metal sheet is bent by press molding or the like to be formed into a predetermined shape.

Fastening member 15 is bent in a U-shape above and below plate-shaped fastening main surface 15a to form bent pieces 15d. Upper and lower bent pieces 15d cover upper and lower surfaces of battery stack 10 from corners on left and right side surfaces of battery stack 10. Fastening member 15 is fixed to outer peripheral surfaces of end plates 20 by screwing bolts 15f into a plurality of screw holes opened in fastening main surface 15a. Note that the fixing between fastening main surface 15a and each of end plates 20 is not necessarily limited to the screwing using a bolt, and may be a pin, a rivet, or the like.

Power supply device 100 in which a large number of battery cells 1 are stacked is configured to bind the plurality of battery cells 1 by connecting end plates 20 disposed at both ends of battery stack 10 including the plurality of battery cells 1 by fastening members 15. By binding the plurality of battery cells 1 via end plates 20 and fastening members 15 having high rigidity, it is possible to suppress expansion, deformation, relative movement, malfunction due to vibration, and the like of battery cells 1 due to charging and discharging, and degradation.

(Insulating Sheet 30)

Further, insulating sheet 30 is interposed between each of fastening members 15 and battery stack 10. Insulating sheet 30 is made of a material having an insulating property, for example, resin, and insulates metal fastening member 15 from the battery cells. Insulating sheet 30 illustrated in FIG. 2 and the like includes flat plate 31 that covers a side surface of battery stack 10, and bent cover parts 32 provided above and below flat plate 31. Bent cover parts 32 are bent in a U shape from flat plate 31 so as to cover bent pieces 15d of fastening member 15, and are then further folded back. Accordingly, since bent pieces 15d are covered with the insulating bent cover parts from the top surface to the side surface and the lower surface, unintended conduction between battery cells 1 and fastening members 15 can be avoided.

Further, bent pieces 15d press the top surface and the lower surface of each of battery cells 1 of battery stack 10 via bent cover parts 32. Consequently, each battery cell 1 is held in a height direction by being pressed by bent pieces 15d from a vertical direction, and even if vibration, impact, or the like is applied to battery stack 10, each battery cell 1 can be maintained so as not to be displaced in the vertical direction.

Note that, when the battery stack or the surface of the battery stack is insulated, for example, when the battery cell is housed in an insulating case, or covered with a heat-shrinkable film made of resin, or when an insulating paint or coating is applied to the surfaces of the fastening members, or when the fastening members are made of an insulating material, the insulating sheet can be unnecessary. Further, insulating sheet 30 may also have bent cover part 32 formed only on a side of the upper end when insulation from bent pieces 15d of fastening members 15 does not need to be taken into consideration on a side of the lower surface of battery stack 10. This corresponds to, for example, a case where battery cells 1 are covered with a heat-shrinkable film.

(Cover Assembly 40)

In power supply device 100, cover assembly 40 is provided on the top surface of battery stack 10. Cover assembly 40 constitutes a gas discharge path for discharging a high-temperature and high-pressure gas to the outside of power supply device 100 when the gas is discharged from any of battery cells 1 constituting battery stack 10. Note that cover assembly 40 may also be configured to serve as a bus bar holder that holds the bus bars.

Figure 4:
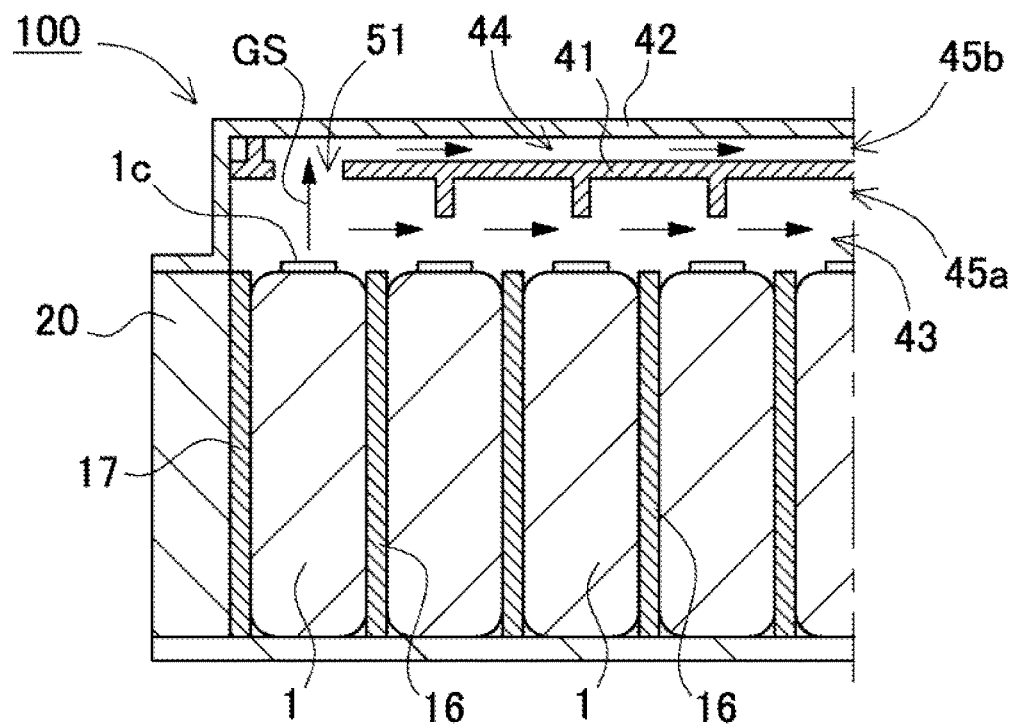
FIG. 4 is an enlarged schematic cross-sectional view illustrating a gas duct part of the power supply device according to the first exemplary embodiment.

As illustrated in the schematic cross-sectional view of FIG. 4, cover assembly 40 includes first cover 41 and second cover 42. First cover 41 is provided on the top surface of battery stack 10, and defines first gas duct 43 communicating with gas discharge valves 1c of battery cells 1 constituting battery stack 10. Further, second cover 42 is provided on a top surface of the first cover 41, and defines second gas duct 44 on a top surface of the first gas duct 43. Furthermore, a plurality of communication holes 51 through which first gas duct 43 and second gas duct 44 communicate with each other are formed in the top surface of first cover 41. In first cover 41, each of communication holes 51 is opened at a position offset from each of gas discharge valves 1c of battery cells 1.

With such a configuration, when gas GS is discharged from battery cells 1, gas GS can be branched into first gas duct 43 and second gas duct 44 through communication holes 51, and the gas can be dispersed and discharged. As a result, it is possible to prevent gas GS from staying inside the power supply device and to suppress a situation in which the gas discharged to the outside is ignited. Further, by providing a plurality of exhaust ports for gas discharge, an opening area of each exhaust port can be reduced, and even if a high-temperature gas is discharged, the risk of ignition can be reduced.

Figure 3:
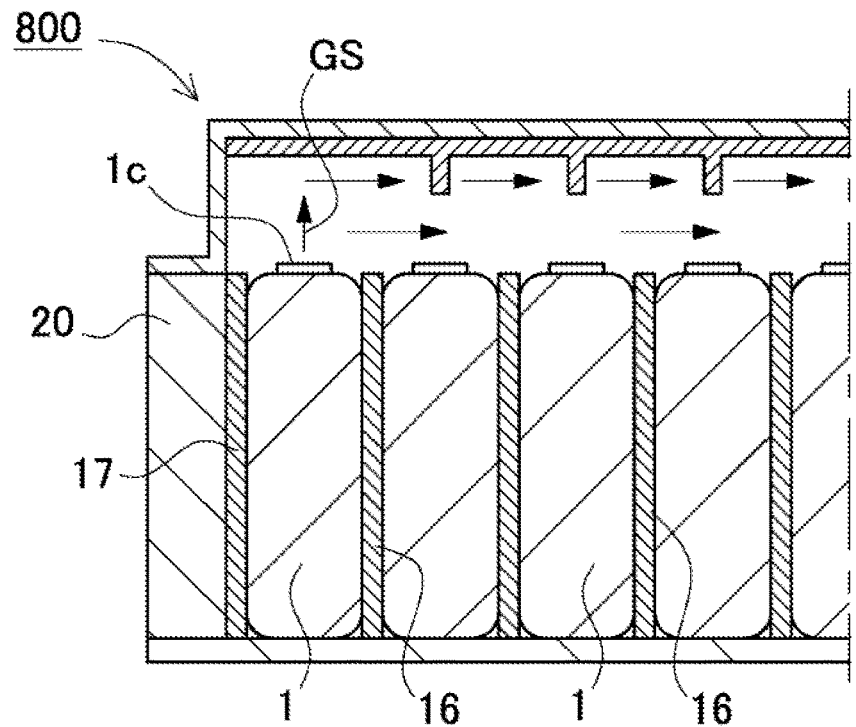
FIG. 3 is an enlarged schematic cross-sectional view illustrating a gas duct part of a power supply device according to a comparative example.

As in power supply device 800 according to a comparative example illustrated in the schematic cross-sectional view of FIG. 3, in a configuration in which the gas duct is a single body, in a case where high-temperature and high-pressure gas GS from one of battery cells 1 is ejected from gas discharge valve 1c, if gas GS stays in the gas duct without being discharged to the outside of power supply device 800, other battery cells adjacent to battery cell 1 are heated, and thermal runaway is considered to be linked. In particular, in a case where there is one gas exhaust port, the gas concentrates on the exhaust port, and the discharge cannot be performed smoothly. Further, it has been found from the tests by the inventors of the present invention that the possibility of ignition increases when a large amount of gas is discharged from one place. However, when the opening area of the exhaust port is reduced, the gas is hardly discharged to the outside, and there is a risk that the gas stays in power supply device 800.

Therefore, in the present exemplary embodiment, by forming a plurality of exhaust ports 45a, 45b for discharging gas, the possibility of ignition is reduced by reducing the opening area per exhaust port while securing a discharge amount of gas. Specifically, as illustrated in the schematic cross-sectional view of FIG. 4, the gas ducts are formed in two stages of first gas duct 43 and second gas duct 44, and gas exhaust ports 45a, 45b are provided in the respective stages to disperse and discharge the gas. With this configuration, it is possible to reduce the opening area per each gas exhaust port while making the total opening area the same, and it is possible to improve safety while avoiding an increase in size of the power supply device.

Figure 5:
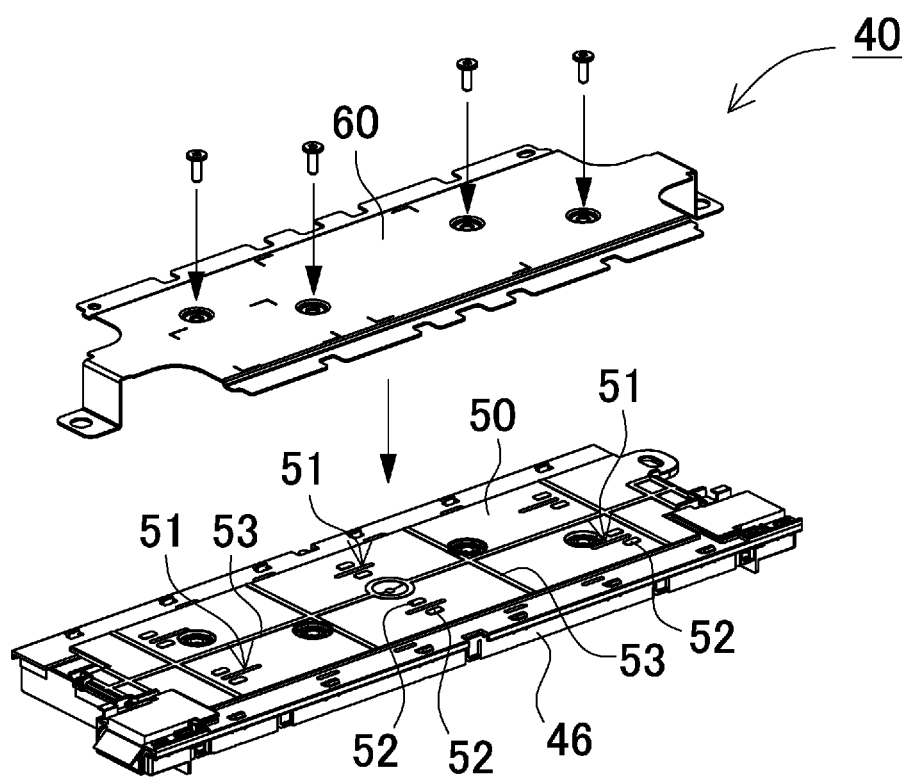
FIG. 5 is an exploded perspective view illustrating a state in which a reinforcing cover is removed from a cover assembly of FIG. 2.
Figure 6:
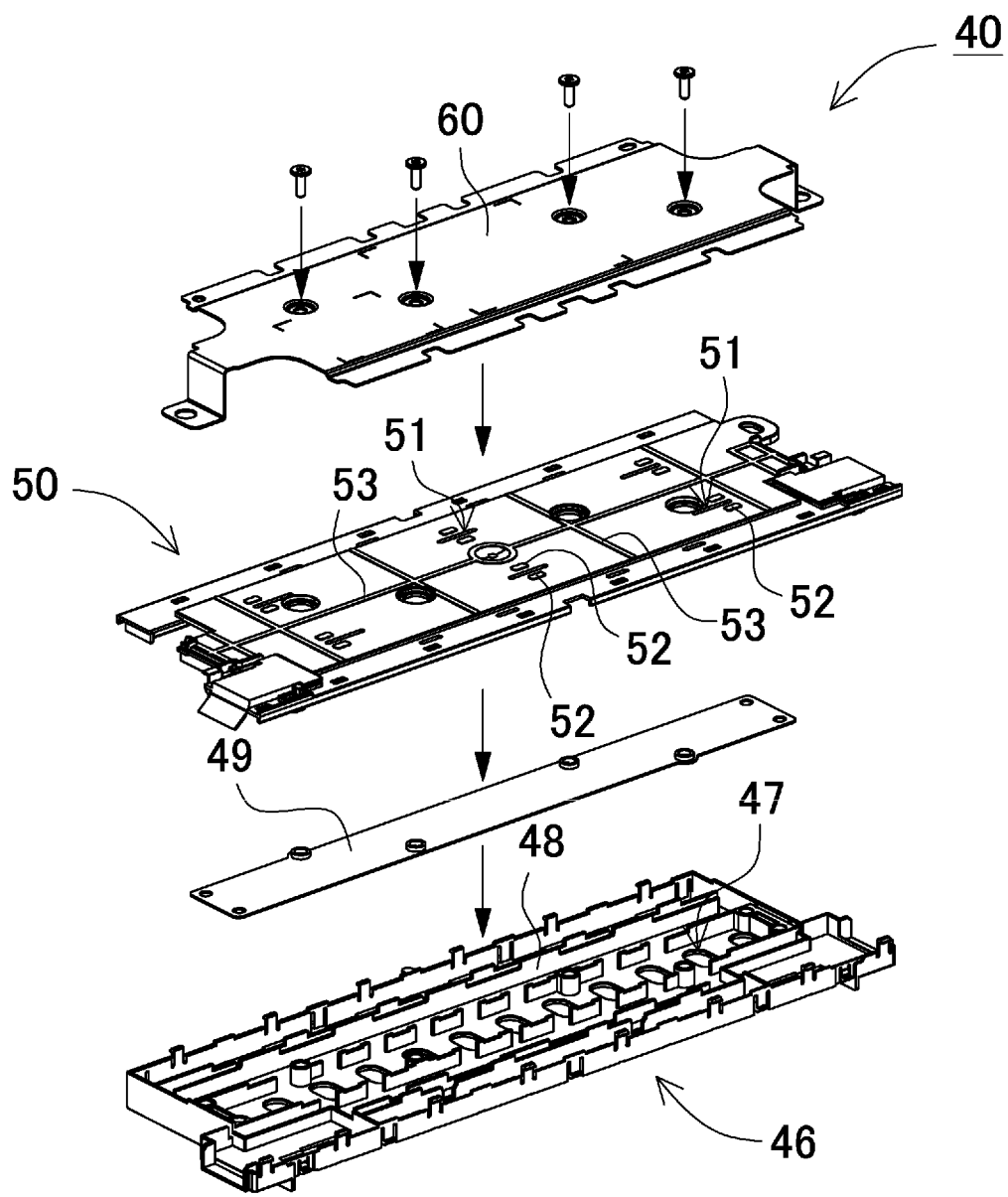
FIG. 6 is an exploded perspective view of FIG. 5.
Figure 7:
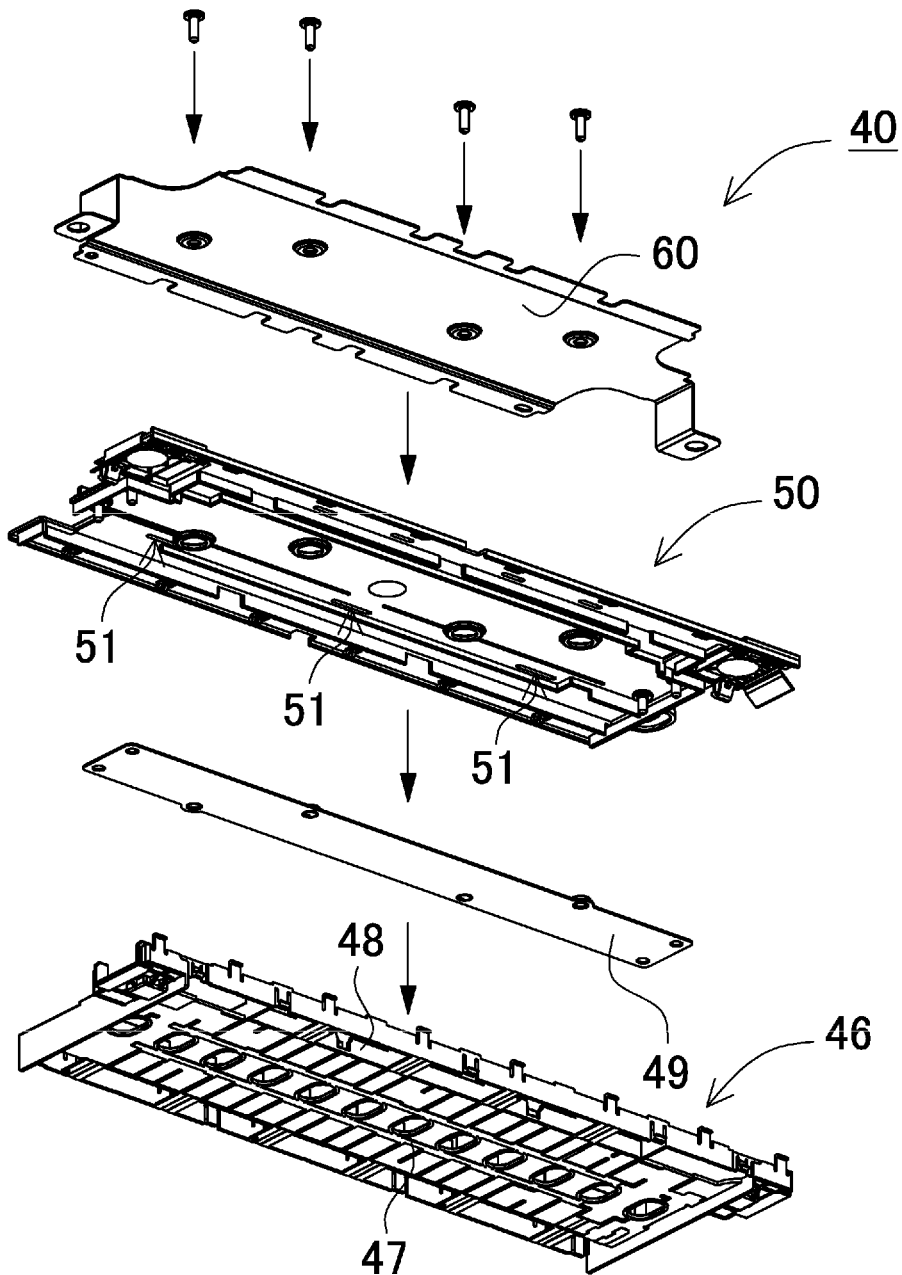
FIG. 7 is an exploded perspective view of FIG. 6 as viewed obliquely from below.
Figure 8:
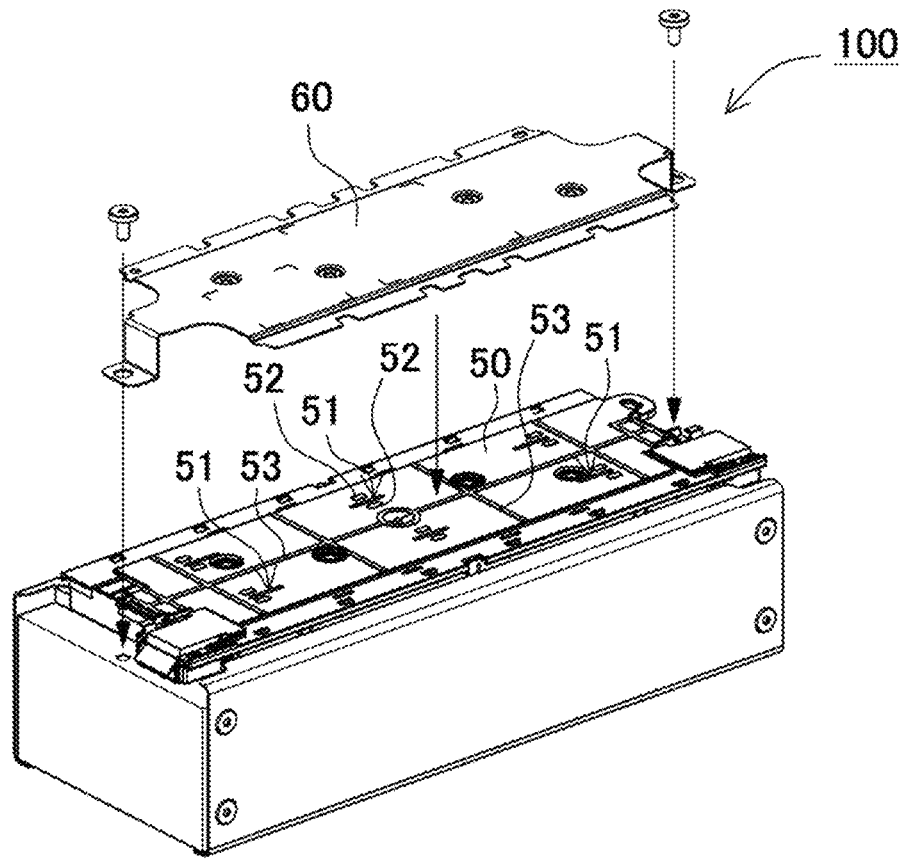
FIG. 8 is an exploded perspective view illustrating a state in which the reinforcing cover is removed from the power supply device of FIG. 1.
Figure 9:
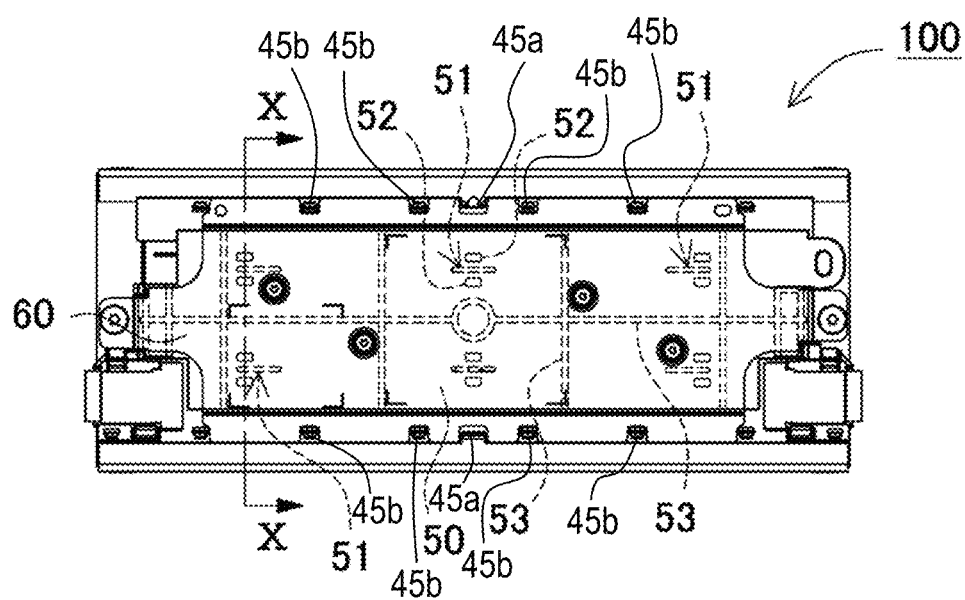
FIG. 9 is a plan view of the power supply device of FIG. 1 in which the reinforcing cover is in a see-through state.
Figure 10:
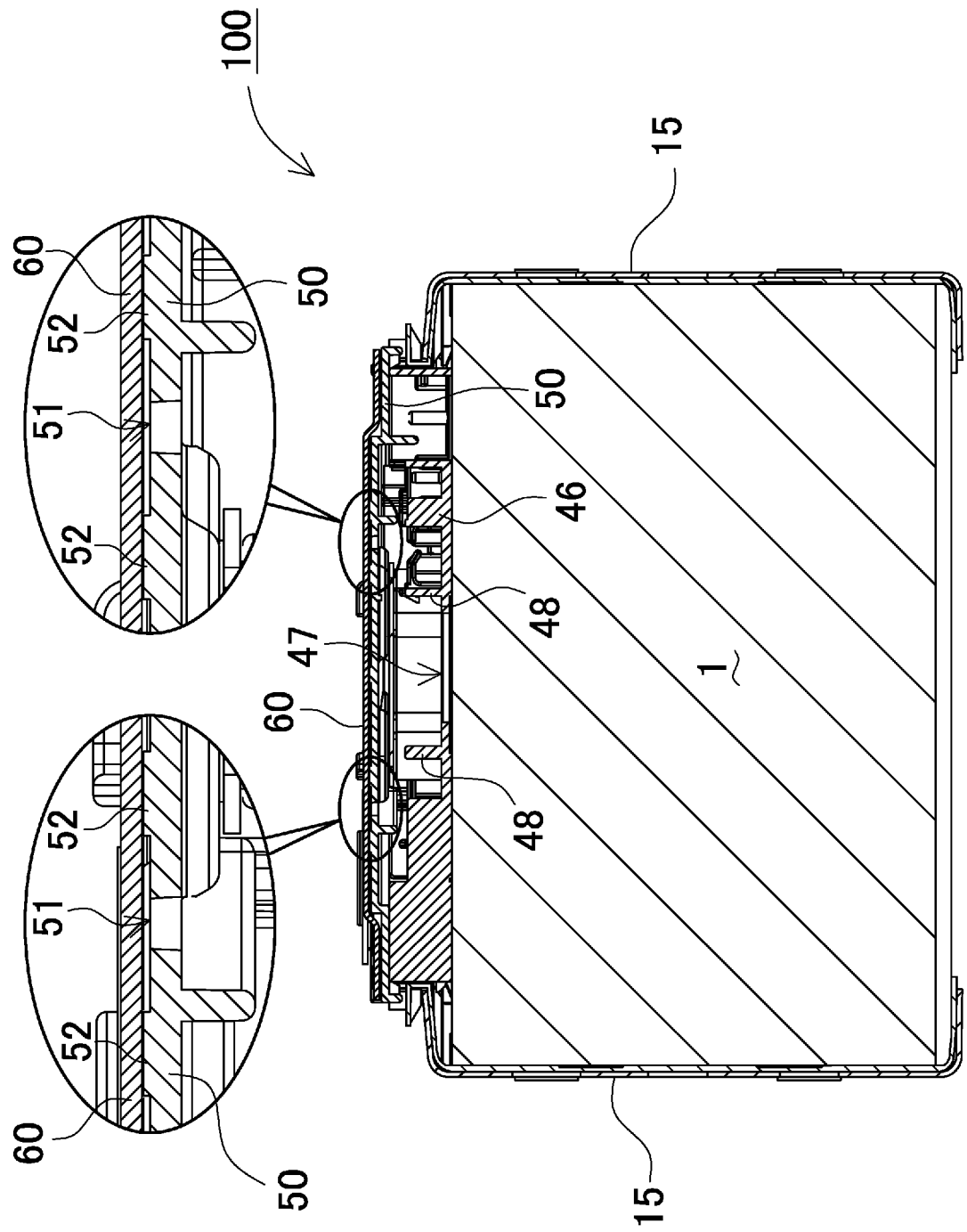
FIG. 10 is a cross-sectional view with an enlarged view of a main part taken along line X-X in FIG. 9.

Hereinafter, a specific configuration of cover assembly 40 will be described with reference to FIGS. 5 to 10. In these drawings, FIG. 5 is an exploded perspective view illustrating a state in which reinforcing cover 60 is removed from cover assembly 40 of FIG. 2, FIG. 6 is an exploded perspective view of FIG. 5, FIG. 7 is an exploded perspective view of FIG. 6 as viewed obliquely from below, FIG. 8 is an exploded perspective view illustrating a state in which reinforcing cover 60 is removed from power supply device 100 of FIG. 1, FIG. 9 is a plan view of power supply device 100 of FIG. 1 in which the reinforcing cover is in a see-through state, and FIG. 10 is a cross-sectional view with an enlarged view of a main part taken along line X-X of FIG. 9. Cover assembly 40 illustrated in these drawings includes lower cover 46, upper cover 50, and reinforcing cover 60. Upper cover 50 corresponds to first cover 41 described above, and reinforcing cover 60 corresponds to second cover 42.

(Lower Cover 46)

Lower cover 46 is provided on the top surface of battery stack 10, and defines first gas duct 43 communicating with gas discharge valves 1c. As illustrated in FIGS. 6 and 7, lower cover 46 has gas introduction port 47 opened at a position corresponding to each of gas discharge valves 1c of battery cells 1. Further, as illustrated in FIGS. 6, 7, 10, and the like, lower cover 46 forms a large number of baffle plates 48, and a traveling direction is changed by baffle plates 48 until the high-temperature and high-pressure gas is discharged, thereby reducing the momentum and lowering the temperature. Furthermore, the gas discharge path is provided not only in the stacking direction of battery cells 1 but also in a direction intersecting the stacking direction. Lower cover 46 is made of resin having excellent insulation properties, for example, polycarbonate.

(Intermediate Plate 49)

Intermediate plate 49 is provided on a top surface of lower cover 46. Intermediate plate 49 is provided at a center in the width direction of battery stack 10, and is disposed so as to face gas discharge valves 1c. Intermediate plate 49 is made of a material having excellent strength, for example, metal. As a result, even if the high-temperature and high-pressure gas is discharged from the gas discharge path, the gas is received by metallic intermediate plate 49 having a higher strength than the resin cover, so that a situation in which the gas is directly ejected through power supply device 100 is avoided.

(Upper Cover 50)

Upper cover 50 is provided on the top surface of lower cover 46, and defines second gas duct 44 on the top surface of first gas duct 43. Upper cover 50 is made of resin. Further, the plurality of communication holes 51 through which first gas duct 43 and second gas duct 44 communicate with each other are formed in a top surface of upper cover 50. As described above, the gas duct has a two-layer structure of first gas duct 43 and second gas duct 44, and thus, even if gas is discharged from the battery cells by any chance, the gas is branched into first gas duct 43 and second gas duct 44, and is discharged in a dispersed manner, so that it is possible to suppress a situation in which the gas discharged to the outside is ignited while avoiding retention of the gas in the power supply device. Further, by providing a plurality of exhaust ports for gas discharge, the cross-sectional area per one can be reduced, and the risk of ignition can be reduced even if a high-temperature gas is discharged.

(Communication Hole 51)

Preferably, communication holes 51 are not opened corresponding to all the battery cells, but are discretely opened so as to serve the plurality of battery cells. In the example of FIG. 6 and the like, three communication holes 51 are opened in the stacking direction with respect to battery stack 10 in which 12 cells of battery cells 1 are stacked.

Communication holes 51 are preferably provided at positions offset from positions facing gas discharge valves 1c. Since communication holes 51 are not directly opened with respect to gas discharge valves 1c, the gas can be easily dispersed. In the example illustrated in FIG. 2, each of gas discharge valves 1c is provided at the center of sealing plate 1b of each of battery cells 1. On the other hand, as illustrated in FIG. 6 and the like, communication holes 51 are opened at positions corresponding to the left and right of sealing plates 1b of battery cells 1.

Each of communication holes 51 is preferably formed in a slit shape. A path area of second gas duct 44 can be set by adjusting a width and a length of the slit, a height of second gas duct 44, and the like, and an amount of gas to be discharged can be controlled. Note that, in the example of FIG. 10 and the like, the height of second gas duct 44 is defined by a height of communication ribs 52 described later.

(Communication Rib 52)

Figure 11:
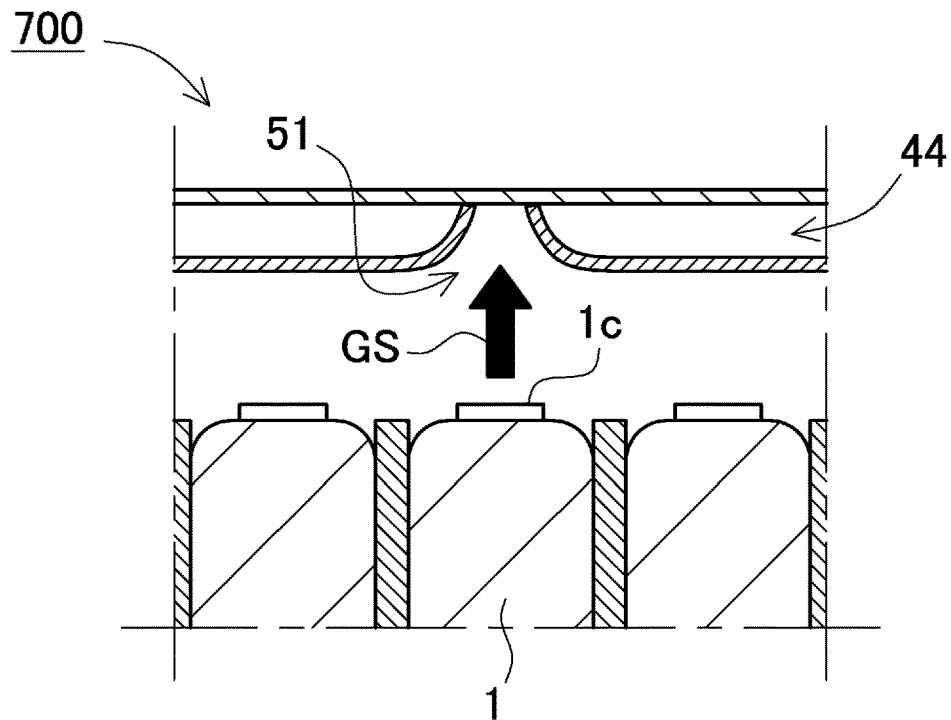
FIG. 11 is an enlarged schematic cross-sectional view illustrating a gas duct part of the power supply device not provided with a communication rib.
Figure 12:
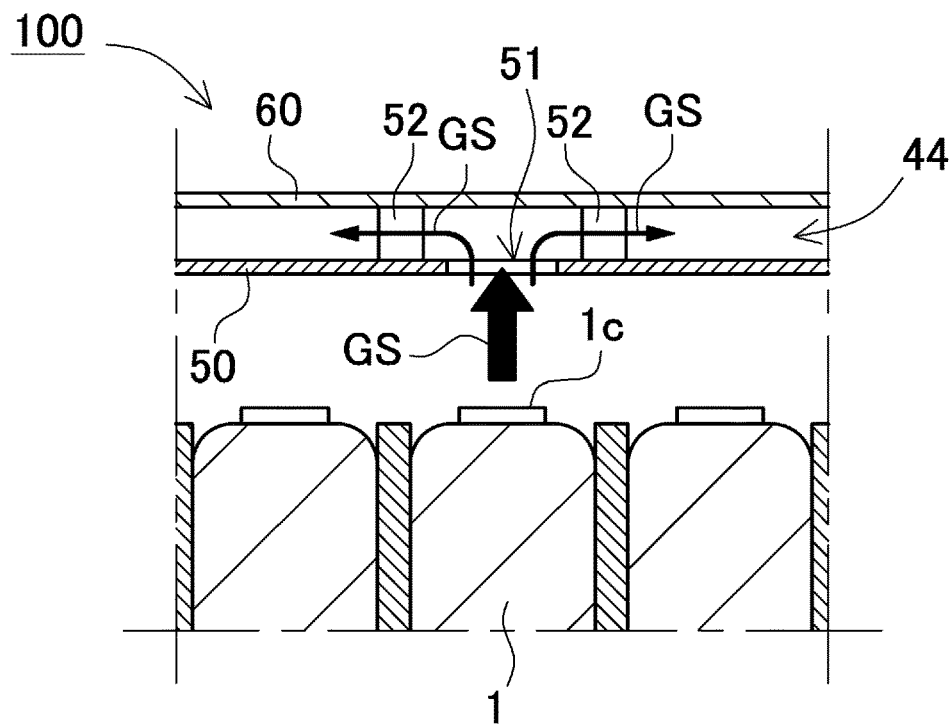
FIG. 12 is an enlarged schematic cross-sectional view illustrating the gas duct part of the power supply device provided with the communication rib.

Upper cover 50 is provided with communication ribs 52 protruding toward a side of reinforcing cover 60 around communication hole 51. In this way, it is possible to prevent a situation in which a path for introducing the gas into second gas duct 44 is obstructed. In a configuration without the communication ribs, as in power supply device 700 illustrated in the schematic cross-sectional view of FIG. 11, when the high pressure gas is discharged from each of gas discharge valves 1c, a periphery of each of communication holes 51 opened in upper cover 50 may be deformed by a pressure of the gas to close the gas discharge path. In this state, the gas is not guided to second gas duct 44, and the gas cannot be dispersed and discharged through second gas duct 44. On the other hand, as illustrated in the schematic sectional view of FIG. 12, by providing communication ribs 52 around communication hole 51, deformation around communication hole 51 is prevented, an opening end to second gas duct 44 is secured, and the high-pressure gas can be guided to second gas duct 44.

Communication ribs 52 are provided not on the entire circumference but on a part of communication hole 51 so as not to block the inflow of the gas into second gas duct 44. Preferably, as illustrated in the plan view of FIG. 9, the pair of communication ribs 52 is provided so as to face both sides of communication hole 51. In a case of the slit-shaped communication hole 51, it is preferable to arrange the pair of communication ribs 52 so as to intersect with a longitudinal direction of the slit. Further, in this example, each of communication ribs 52 is integrally molded with resin upper cover 50. With this configuration, communication ribs 52 can be positioned around communication hole 51 and easily formed. However, it is needless to say that the communication ribs may be provided on a side of the reinforcing cover. In particular, by protruding the communication ribs on the metallic reinforcing cover by punching or the like, communication ribs that are stronger and hardly deformed can be formed.

(Partition Rib 53)

Further, upper cover 50 is provided with partition rib 53 that partitions between the plurality of communication holes 51 adjacent to each other. As a result, second gas duct 44 can be partitioned for each of communication holes 51, and the high-pressure gas introduced from communication hole 51 into second gas duct 44 can be prevented from being discharged in a concentrated manner at one place.

In the example of FIG. 6 and the like, battery stack 10 in which 12 cells of battery cells 1 are stacked is divided into three sections for every four cells, and further divided into two sections on the left and right of battery cell 1, so that battery stack 10 is divided into a total of six sections.

Further, in the example of FIG. 6, the partition rib protrudes from the top surface of upper cover 50, but the present invention is not limited to this configuration, and it goes without saying that the partition rib may protrude from the side of the reinforcing cover, for example.

Further, the gas discharge path is preferably provided not only in the stacking direction of battery cells 1 but also in a direction intersecting with the stacking direction. By discharging the gas also from the intersecting direction in this manner, it is possible to efficiently discharge the gas to the outside of the power supply device and enhance safety. In the example of FIG. 9, a gas discharge path is formed in each of first gas duct 43 and second gas duct 44 so that the gas is also discharged in the vertical direction in the drawing.

(Reinforcing Cover 60)

Reinforcing cover 60 is provided on the top surface of upper cover 50. Second gas duct 44 is formed between reinforcing cover 60 and upper cover 50. Further, reinforcing cover 60 is in contact with the top surface of the second cover via communication ribs 52. With such a configuration, even if a high-temperature and high-pressure gas is discharged from the gas discharge valve, deformation of upper cover 50 can be suppressed by reinforcing the top surface of upper cover 50 with metal reinforcement. In particular, when upper cover 50 is deformed, there is a possibility that an unintended gas discharge path avoiding baffle plate 48 is formed, but such a situation can be avoided by preventing the deformation of upper cover 50 with reinforcing cover 60.

Power supply device 100 described above can be used as a power source for a vehicle that supplies electric power to a motor that causes an electric vehicle to travel. As an electric vehicle on which power supply device 100 is mounted, an electric vehicle such as a hybrid automobile or a plug-in hybrid automobile that travels by both an engine and a motor, or an electric automobile that travels only by a motor can be used, and is used as a power source of these vehicles. Note that, in order to obtain power for driving the electric vehicle, an example will be described in which a large number of the above-described power supply devices 100 are connected in series or in parallel, and a large-capacity and high-output power supply device to which a necessary controlling circuit is further added is constructed.

(Power Supply Device for Hybrid Vehicle)

Figure 13:
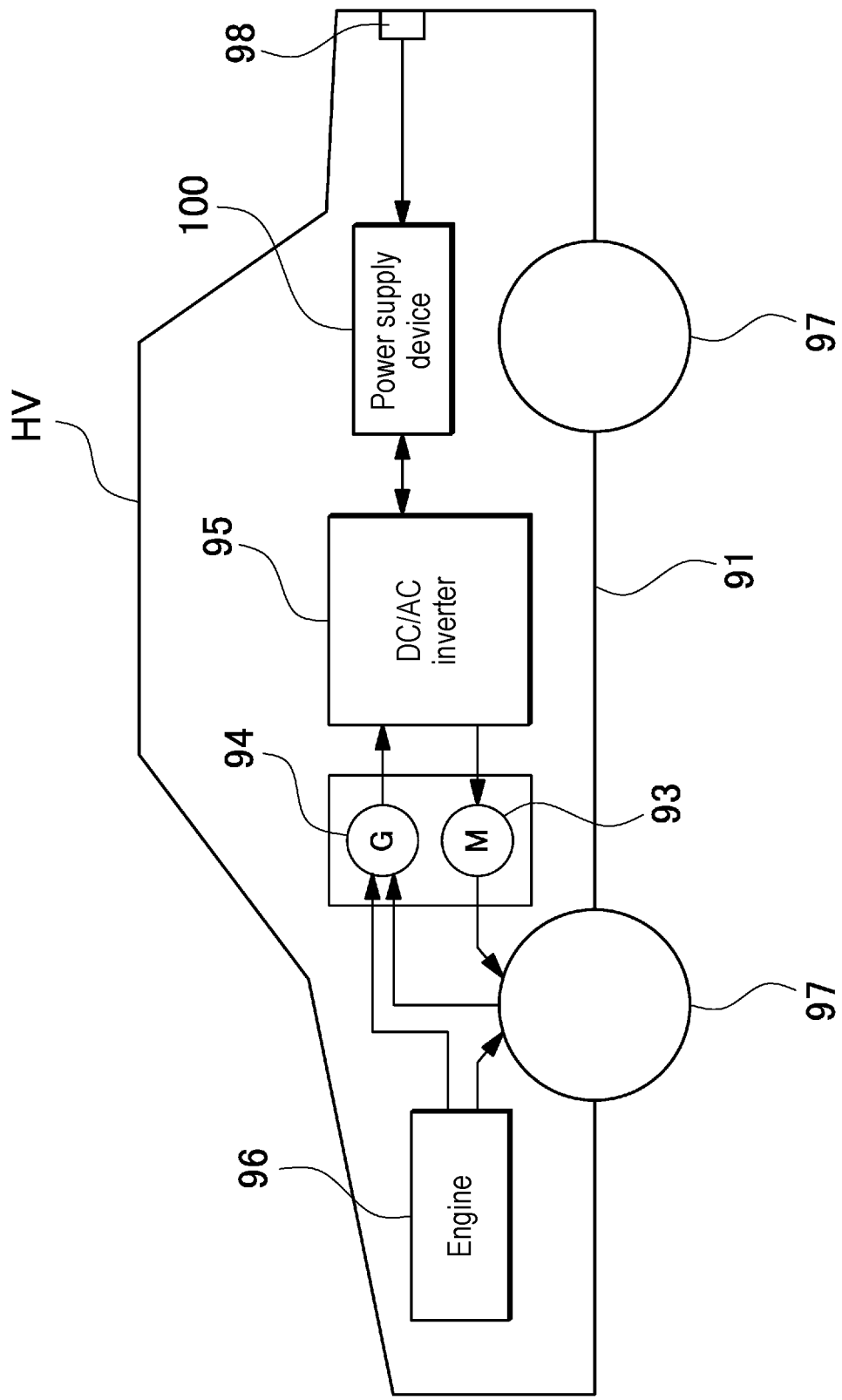
FIG. 13 is a block diagram illustrating an example in which a power supply device is mounted on a hybrid vehicle that travels by an engine and a motor.

FIG. 13 illustrates an example in which power supply device 100 is mounted on a hybrid automobile that travels by both an engine and a motor. Vehicle HV on which power supply device 100 illustrated in this drawing is mounted includes vehicle body 91, engine 96 and drive motor 93 that cause vehicle body 91 to travel, wheels 97 driven by engine 96 and drive motor 93, power supply device 100 that supplies electric power to motor 93, and generator 94 that charges a battery of power supply device 100. Power supply device 100 is connected to motor 93 and generator 94 via DC/AC inverter 95. Vehicle HV travels by both motor 93 and engine 96 while charging and discharging the battery of power supply device 100. Motor 93 is driven to cause the vehicle to travel in an area with poor engine efficiency, for example, at the time of acceleration or low speed traveling. Motor 93 is driven by electric power supplied from power supply device 100. Generator 94 is driven by engine 96 or by regenerative braking when braking the vehicle to charge the battery of power supply device 100. Note that, as illustrated in FIG. 13, vehicle HV may include charging plug 98 for charging power supply device 100. Power supply device 100 can be charged by connecting charging plug 98 to an external power source.

(Power Supply Device for Electric Automobile)

Figure 14:
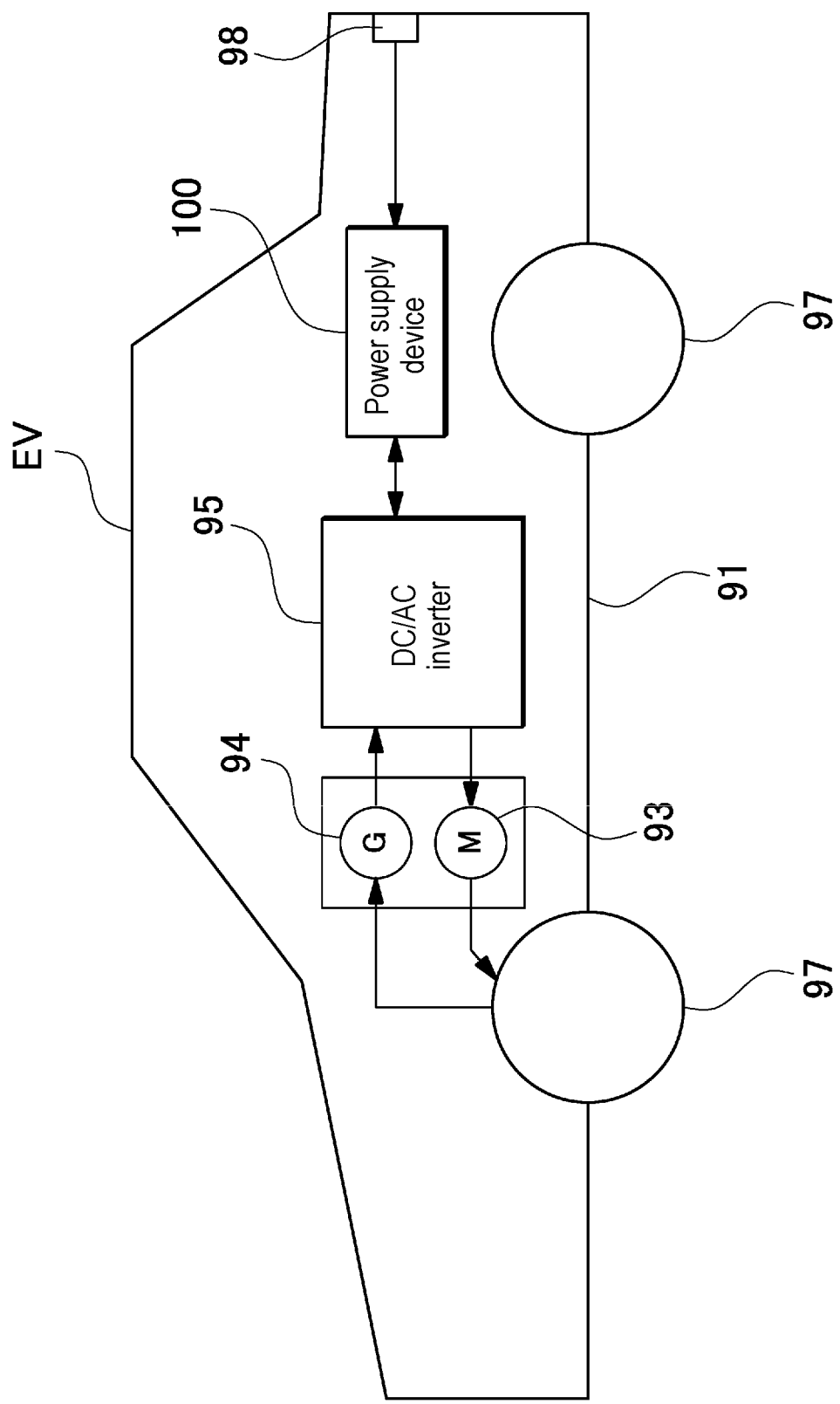
FIG. 14 is a block diagram illustrating an example in which a power supply device is mounted on an electric vehicle that travels only by a motor.

Further, FIG. 14 illustrates an example in which power supply device 100 is mounted on an electric automobile that travels only by a motor. Vehicle EV on which power supply device 100 illustrated in this drawing is mounted includes vehicle body 91, drive motor 93 that causes vehicle body 91 to travel, wheels 97 driven by motor 93, power supply device 100 that supplies electric power to motor 93, and generator 94 that charges a battery of power supply device 100. Power supply device 100 is connected to motor 93 and generator 94 via DC/AC inverter 95. Motor 93 is driven by electric power supplied from power supply device 100. Generator 94 is driven by an energy at the time of regenerative braking of vehicle EV to charge the battery of power supply device 100. Further, vehicle EV includes charging plug 98, and power supply device 100 can be charged by connecting charging plug 98 to an external power source.

(Power Supply Device for Electrical Storage Device)

Figure 15:
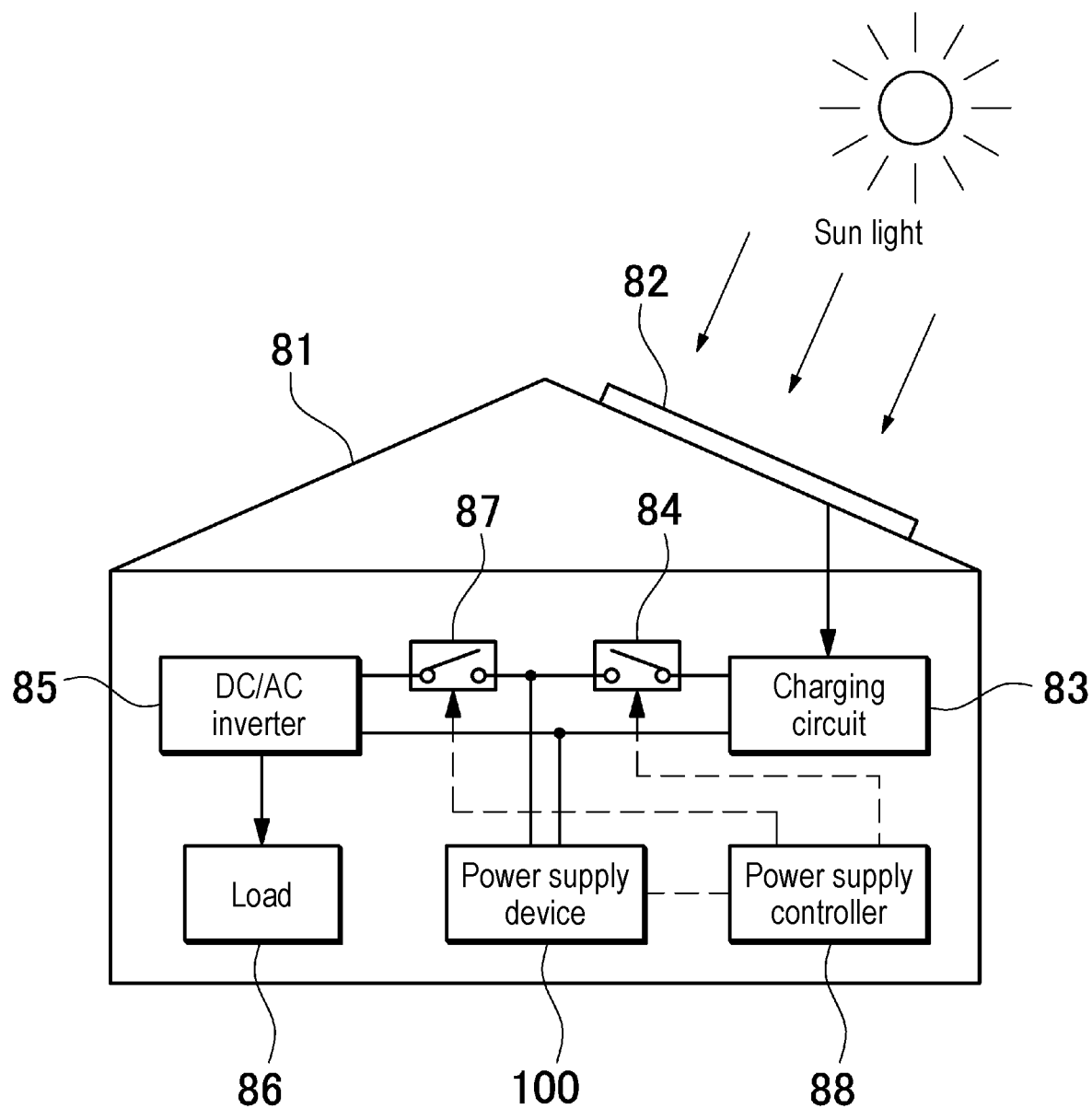
FIG. 15 is a block diagram illustrating an example of application to a power supply device for electrical storage.

Furthermore, the present invention does not specify the application of the power supply device as the power source of the motor that causes the vehicle to travel. The power supply device according to the exemplary embodiment can also be used as a power source of an electrical storage device that charges and stores a battery with electric power generated by solar power generation, wind power generation, or the like. FIG. 15 illustrates an electrical storage device that charges and stores a battery of power supply device 100 with solar battery 82.

The electrical storage device illustrated in FIG. 15 charges the battery of power supply device 100 with electric power generated by solar battery 82 disposed on a roof, a rooftop, or the like of building 81 such as a house or a factory. In this electrical storage device, the battery of power supply device 100 is charged by charging circuit 83 using solar battery 82 as a charging power source, and then electric power is supplied to load 86 via DC/AC inverter 85. Therefore, the electrical storage device has a charge mode and a discharge mode. In the electrical storage device illustrated in the drawing, DC/AC inverter 85 and charging circuit 83 are connected to power supply device 100 via discharge switch 87 and charge switch 84, respectively. ON/OFF of discharge switch 87 and charge switch 84 is switched by power supply controller 88 of the electrical storage device. In the charge mode, power supply controller 88 switches charge switch 84 to ON and switches discharge switch 87 to OFF to permit charging from charging circuit 83 to power supply device 100. Further, when the charging is completed and the battery is fully charged, or in a state where a capacity larger than or equal to a predetermined value is charged, power supply controller 88 turns off charge switch 84 and turns on discharge switch 87 to switch to the discharge mode, and permits discharging from power supply device 100 to load 86. Furthermore, it is also possible to simultaneously supply electric power to load 86 and charge power supply device 100 by turning on charge switch 84 and turning on discharge switch 87 as necessary.

Further, although not illustrated, the power supply device can also be used as a power source of an electrical storage device that charges and stores a battery using midnight electric power at night. The power supply device charged with the midnight electric power can be charged with midnight electric power that is surplus electric power of a power plant, output electric power in the daytime when an electric power load becomes large, and limit a peak electric power in the daytime to be small. Furthermore, the power supply device can also be used as a power source that charges with both the output of the solar battery and the midnight electric power. This power supply device can efficiently store electricity while considering weather and electric power consumption by effectively using both electric power generated by the solar battery and midnight electric power.

The electrical storage system as described above can be suitably used for applications such as a backup power supply device that can be mounted on a rack of a computer server, a backup power supply device for a wireless base station such as a cellular phone, a power source for household or factory electrical storage, a power source for street lamps, and the like, an electrical storage device combined with a solar battery, and a backup power source for traffic lights and traffic indicators for roads.

INDUSTRIAL APPLICABILITY

A power supply device according to the present invention, and a vehicle and an electrical storage device including the power supply device can be suitably used as a power source for a large current used for a power source of a motor for driving an electric vehicle such as a hybrid vehicle, a fuel battery automobile, an electric automobile, or an electric motorcycle. Examples thereof include power supply devices for plug-in hybrid electric automobiles and hybrid electric automobiles capable of switching between an EV traveling mode and an HEV traveling mode, electric automobiles, and the like. Further, the present invention can be appropriately used for applications such as a backup power supply device that can be mounted on a rack of a computer server, a backup power supply device for a wireless base station such as a cellular phone, a power source for electrical storage for home and factory use, a power source for street lamps, and the like, an electrical storage device combined with a solar battery, and a backup power source for traffic lights and the like.

REFERENCE MARKS IN THE DRAWINGS

100, 700, 800: power supply device
1: battery cell
1X: terminal surface
1a: outer covering
1b: sealing plate
1c: gas discharge valve
2: electrode terminal
10: battery stack
15: fastening member
15a: fastening main surface
15d: bent piece
15f: bolt
16: insulating spacer
17: end surface spacer
20: end plate
30: insulating sheet
31: flat plate
32: bent cover part
40: cover assembly
41: first cover
42: second cover
43: first gas duct
44: second gas duct
45a, 45b: gas exhaust port
46: lower cover
47: gas introduction port
48: baffle plate
49: intermediate plate
50: upper cover
51: communication hole
52: communication rib
53: partition rib
60: reinforcing cover
81: building
82: solar battery
83: charging circuit
84: charge switch
85: DC/AC inverter
86: load
87: discharge switch
88: power supply controller
91: vehicle body
93: motor
94: generator
95: DC/AC inverter
96: engine
97: wheel
98: charging plug
GS: gas
HV, EV: vehicle

The invention claimed is:

1. A power supply device comprising:

a battery stack in which a plurality of battery cells are stacked, each of the plurality of battery cells including a gas discharge valve on a top surface of the each of the plurality of battery cells, and the gas discharge valve opening when an internal pressure of an outer covering can of the each of the plurality of battery cells increases, the gas discharge valve disposed at a top surface of the battery stack;

a first cover provided on the top surface of the battery stack and defining a first gas duct that communicates with the gas discharge valve of each of the plurality of battery cells; and a second cover provided on a top surface of the first cover and defining a second gas duct on a top surface of the first gas duct, wherein a plurality of communication holes that communicate the first gas duct and the second gas duct are disposed on the top surface of the first cover, wherein the first gas duct has a first gas exhaust port, and the second gas duct has a plurality of second gas exhaust ports separate from the first gas exhaust port, each of the first gas exhaust port and the plurality of the second gas exhaust ports individually open to an outside of the power supply device, wherein the first gas duct and the second gas duct are configured to individually discharge gas from the gas discharge valve to the outside of the power supply device via a corresponding one of the first gas exhaust port and the plurality of the second gas exhaust ports, respectively, wherein the first cover includes a communication rib protruding toward the second cover around each of the plurality of communication holes, and wherein the first cover includes a partition rib that partitions between adjacent ones of the plurality of communication holes so as to form partitioned spaces, and one of the plurality of the second gas exhaust ports provided at each of the partitioned spaces.

2. The power supply device according to claim 1, wherein the plurality of communication holes open at positions offset from the gas discharge valves of the plurality of battery cells.

3. The power supply device according to claim 1, wherein the each of the communication holes includes a slit shape.

4. The power supply device according to claim 1, wherein the first cover is made of resin.

5. The power supply device according to claim 1, wherein the second cover is made of metal.

6. The power supply device according to claim 1, wherein the each of the plurality of battery cells includes:
  the outer covering can including a prism shape with an upper opening; and a sealing plate that closes the upper opening of the outer covering,
  the gas discharge valve is provided in a central part of the sealing plate, and
  the first gas duct is configured to discharge gas in a stacking direction of the plurality of battery cells and a side surface direction orthogonal to the stacking direction.

7. A vehicle including the power supply device according to claim 1, the vehicle comprising:
  the power supply device;
  a drive motor to which electric power is supplied from the power supply device;
  a vehicle main body on which the power supply device and the drive motor are mounted; and
  wheels driven by the drive motor to cause the vehicle main body to travel.

8. An electrical storage device including the power supply device according to claim 1, the electrical storage device comprising:
  the power supply device; and
  a power supply controller that controls charging to and discharging from the power supply device, wherein the power supply controller enables charging to the plurality of battery cells with electric power from an outside power source, and controls the plurality of battery cells to be charged.

* * * * *